United States Patent
Leutwein

(10) Patent No.: US 8,836,162 B2
(45) Date of Patent: Sep. 16, 2014

(54) INVERTER FOR PHOTOVOLTAIC SYSTEMS

(75) Inventor: Gerhard Leutwein, Kunzelsau (DE)

(73) Assignee: Ziehl-Abegg AG, Kunzelsau (DE)

( * ) Notice: Subject to any disclaimer, the term of this patent is extended or adjusted under 35 U.S.C. 154(b) by 875 days.

(21) Appl. No.: 13/034,607

(22) Filed: Feb. 24, 2011

(65) Prior Publication Data

US 2011/0210612 A1 Sep. 1, 2011

(30) Foreign Application Priority Data

Feb. 26, 2010 (DE) .......................... 10 2010 009 484
Feb. 26, 2010 (EP) ...................................... 10002013

(51) Int. Cl.
*H02J 1/10* (2006.01)
*H02J 3/38* (2006.01)
(52) U.S. Cl.
CPC .............. *H02J 3/383* (2013.01); *Y02E 10/563* (2013.01)
USPC ........................................... 307/43; 307/126
(58) Field of Classification Search
CPC ..................................... H02J 3/00; H02J 3/38
USPC ............................................................ 307/43
See application file for complete search history.

(56) References Cited

U.S. PATENT DOCUMENTS

| 6,331,670 | B2 | 12/2001 | Takehara et al. | |
|---|---|---|---|---|
| 6,624,535 | B2 * | 9/2003 | Morrow | 307/71 |
| 6,800,964 | B2 * | 10/2004 | Beck | 307/126 |
| 7,408,268 | B1 | 8/2008 | Nocentini et al. | |
| 2003/0080741 | A1 * | 5/2003 | LeRow et al. | 324/320 |
| 2008/0094867 | A1 | 4/2008 | Muller et al. | |
| 2009/0121549 | A1 * | 5/2009 | Leonard | 307/51 |
| 2009/0167097 | A1 | 7/2009 | Seymour et al. | |
| 2011/0006194 | A1 * | 1/2011 | Pereira Morais Dos Santos et al. | 250/208.2 |
| 2011/0031813 | A1 * | 2/2011 | Falk | 307/77 |

FOREIGN PATENT DOCUMENTS

| DE | 10 2006 033 836 A1 | 3/2007 |
|---|---|---|
| DE | 10 2008 050 543 A1 | 10/2008 |
| EP | 1 914 857 A1 | 10/2006 |
| JP | 07-049721 | 2/1995 |

* cited by examiner

*Primary Examiner* — Jared Fureman
*Assistant Examiner* — Toan Vu
(74) *Attorney, Agent, or Firm* — Blakely Sokoloff Taylor & Zafman

(57) ABSTRACT

An inverter for solar panels which includes at least two inverter inputs to each of which a group of solar panels can be connected, and an inverter output to which a network can be connected. The inverter includes an inverter element with a direct voltage input and an alternating voltage output which converts a direct voltage into alternating voltage and sends it to the inverter output. An electronic control system monitors the direct voltage and the network voltage and/or the network frequency of the network. A switching system is electrically arrayed between one of the at least two inverter inputs and the direct voltage input of the inverter element. The electronic control system triggers the switching system to disconnect the at least one inverter input of the inverter from the direct voltage input of the inverter element.

10 Claims, 1 Drawing Sheet

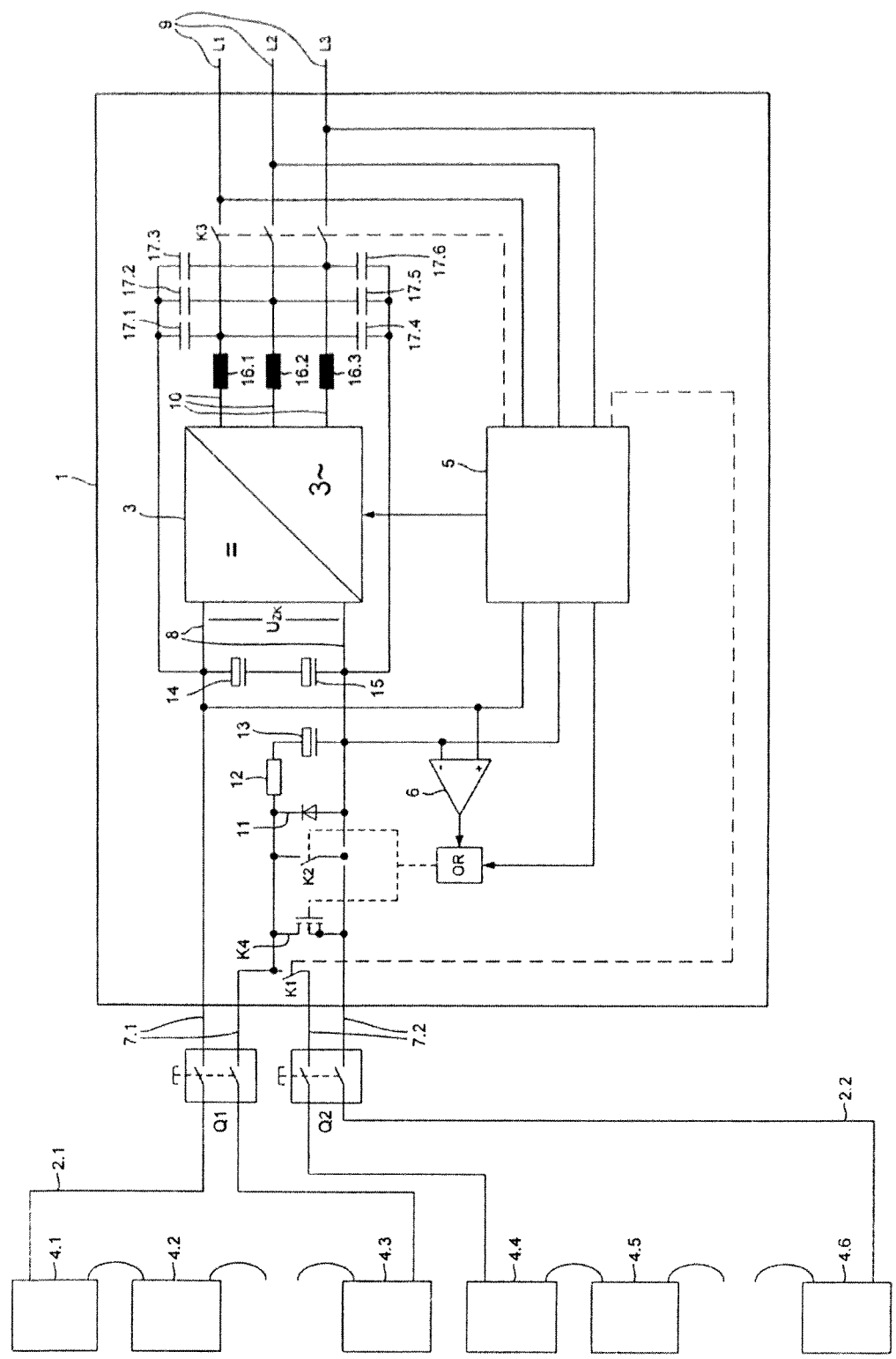

ically limited to 1000V.
INVERTER FOR PHOTOVOLTAIC SYSTEMS

FIELD OF THE INVENTION

The invention concerns the field of inverters for photovoltaic systems and particularly an inverter which is able to operate both under load and in an open circuit with the aid of control electronics with a high open-circuit voltage.

BACKGROUND OF THE INVENTION

The conversion of light energy into electrical energy through the use of photovoltaic systems has been known for a long time. These photovoltaic systems are increasingly used in the residential, economic and industrial fields. Photovoltaic systems typically include—among other components—solar panels which generate a high direct current when several are connected in a series (=photovoltaic string), as well as an inverter which converts the direct voltage into alternating voltage (e.g., single phase or triple phase current). The number of solar panels which are connected in a string is usually selected in accordance with the desired open-circuit voltage of the string at a low environmental temperature (e.g., −10° C.). It is often desirable to design and operate photovoltaic strings which put out the highest possible voltage and with this, a lower current in order to reduce costs for elements of high current tolerance as well as energy losses during the transfer of electricity. Based on existing standards and on a permissible maximum voltage of the string, the maximum open-circuit voltage is currently limited to 1000V.

Inverters are available for a large variety of voltage tolerances, wherein the costs of the inverter and its loss performance increase as the voltage tolerance rises.

The inverters, which are available on the market today, feed in between a phase and the zero conductor. The available three-phase inverters include three single-phase inverters within a housing which then feed into all three phases and against the zero conductor. The most modern inverters for solar panels are laid out for a maximum direct voltage open-circuit voltage of 850V. The load voltage of the solar panel (i.e., when they are connected to a current collector), is, however, considerably lower than the open-circuit voltage. At an open-circuit voltage of 850V, a maximum load voltage in the range of 650V is possible. Direct voltage of at least 650V in the partial load range is required to feed into a three-phased 400V network via an inverter which is laid out in three phases, taking the normal tolerances and the voltage drop at the filter chokes into account. To allow this, the system must be laid out for an open-circuit voltage of at least 1100 V; however, this is not permissible according to the standards. When complying with the standards, therefore, the amount of available voltage is insufficient to perform, e.g., a three-phase infeed into a 400 V network without an additional boost converter. At a network voltage of 480 V, a load voltage of 710 V and an open-circuit voltage of 1200 V are therefore required.

US 2009/0167097 provides an interface which is in operation solely during a start and end phase to gradually connect or disconnect the photovoltaic string to and from the inverter. The photovoltaic string is gradually placed under load; consequently, the voltage of the system is reduced from an initial voltage (open-circuit voltage) to a lower voltage (e.g., approximately an optimal voltage for the inverter). As soon as the photovoltaic string is under load and the voltage of the photovoltaic string has been reduced from its initial voltage, the interface connects the photovoltaic string to the inverter. Consequently the inverter is not exposed to the possibly damaging open-circuit voltages of the photovoltaic string. In accordance with this invention, the efficiency of the system is significantly improved as compared to the state of the art since the inverter is made from silicon, which is operated at lower voltages than the open-circuit voltage of the photovoltaic string.

SUMMARY OF THE INVENTION

One aspect of the invention concerns an inverter for solar panels which includes at least two inverter inputs, to each of which a group of solar panels can be connected, and an inverter output to which a network can be connected. The inverter includes an inverter element with a direct voltage input and an alternating voltage output which converts the direct voltage that is connected to its direct voltage input into alternating voltage and sends it to the inverter output, an electronic control system which monitors the direct voltage that is connected to the direct voltage that is connected to the direct voltage input of the inverter element and the network voltage and/or the network frequency of the network which is connected to the inverter output, and a switching system which is electrically arranged between one of the at least two inverter inputs and the direct voltage input of the inverter element, wherein the at least two inverter inputs of the inverter are connected with the direct voltage input of the inverter element in series. The electronic control system is designed so that it causes the switching system to disconnect the at least one inverter input of the inverter from the direct voltage input of the inverter element if the voltage that is connected to the direct voltage input of the inverter element exceeds an upper threshold parameter and/or the network voltage and/or the network frequency of the network which is connected to the inverter output lies outside a previously specified normal voltage or normal frequency range.

A further aspect of the invention concerns a process for controlling an inverter for solar panels. The inverter includes at least two inverter inputs to each of which a group of solar panels can be connected, and an inverter output to which a network can be connected, as well as an inverter element with a direct voltage input and an alternating voltage output, which transforms the direct voltage that is connected to its direct voltage input into alternating voltage and sends it to the inverter output. The process includes monitoring of the direct voltage which is connected to the direct voltage input and the network voltage and/or the network frequency of the network which is connected to the inverter output, and disconnection of the at least one inverter input of the inverter from the direct voltage input of the inverter element if the voltage that is connected to the direct voltage input of the inverter element exceeds an upper threshold parameter and/or the network voltage and/or the network frequency of the network which is connected to the inverter output lies outside a previously specified normal voltage or normal frequency range.

BRIEF DESCRIPTION OF THE DIAGRAM

Embodiments of the invention are now described in an exemplary manner and with reference to the enclosed diagram.

The sole FIGURE shows an inverter for solar panels in accordance with an embodiment of the invention.

The diagram and the description of the diagram refer to an embodiment of the invention, but not to the invention itself.

DESCRIPTION OF THE PREFERRED EMBODIMENTS

The FIGURE shows a circuit diagram of an inverter 1 in accordance with the invention, with a first string 2.1 that is connected to it and a second string 2.2. However, before continuing with the description of FIG. 1, a few terms of the embodiments will be explained.

The embodiments of the invention refer to an inverter for solar panels which includes at least two converter inputs to each of which a group of solar panels can be connected, and an inverter output to which a network can be connected. The inverter includes an inverter element with a direct voltage input and an alternating voltage output which converts the direct voltage that is connected to its direct voltage input into alternating voltage and sends it to the inverter output, an electronic control system which monitors the direct voltage which is connected to the direct voltage input of the inverter element and the network voltage and/or the network frequency of the network which is connected to the inverter output, and a switching system which is electrically arranged between one of the at least two inverter inputs and the direct voltage input of the inverter, wherein the at least two inverter inputs of the inverter are connected in series with the direct voltage input of the inverter element. The electronic control system is designed so that it will cause the switching system to disconnect the at least one inverter input of the inverter from the direct voltage input of the inverter element if the voltage that is connected to the direct voltage input of the inverter element exceeds an upper threshold parameter and/or the network voltage and/or the network frequency of the network which is connected to the inverter output lies outside a previously specified normal voltage or normal frequency range.

In some embodiments, a group of solar panels includes a large number of solar panels, while a group of solar panels consists of only a single solar panel in other embodiments.

In some embodiments, the normal voltage or normal frequency range includes an interval of permissible voltage and frequency values in each case, while the normal voltage or normal frequency range of other embodiments includes individual permissible voltage and frequency values which may also cover a tolerance range.

An inverter is an electrical device which converts direct voltage into alternating voltage or direct current into alternating current. The present invention considers inverters which convert the direct current that is produced by solar panels into alternating current. Depending on their switching, inverters can be laid out both for generating single-phase alternating current and for generating three-phase alternating current (rotary current).

In some embodiments of the invention, the inverter element is implemented as a three-phase inverter element which does not require a transformer and is implemented using IGB (insulated gate bipolar) transistors. An IGB transistor (a bipolar transistor with an isolated gate electrode) is a semiconductor component which is finding increasing use in power electronics (particularly also for inverters), since it combines the benefits of bipolar transistors (good passage behavior, high reverse voltage, robustness) and the benefits of a field effect transistor (activated with almost no power usage). Another benefit consists of a certain robustness in response to short circuits, since the IGB transistor limits the load current.

Inverters are used where an electrical consumer requires alternating voltage for operation, but only a source of direct voltage such as the solar panels in this invention is available, or where the output from a source of direct voltage is to be fed into the alternating current or rotary current network.

A solar panel (also referred to as a solar module or photovoltaic module) directly converts the light of the sun into electrical energy. It contains several solar cells as its most important components. Solar panels are—either individually or in groups (strings)—interconnected to make photovoltaic systems, or connected to small, network-independent consumers, or used as a power supply for space travel vehicles. The entirety of all panels for a photovoltaic system is referred to as a solar generator. A solar panel is characterized by its electrical connection values (such as the open-circuit voltage and short-circuit current). These depend on the properties of the individual solar cells and the ways in which the solar cells are connected within the panel. The groups of solar panels which are considered within the scope of this invention typically provide an output performance of 2-50 kW. The inverter is laid out in accordance with this output.

In some embodiments of the invention, the switching system includes a switching element which is activated by the electronic control system to disconnect the at least one inverter input of the inverter from the direct voltage input of the inverter element if the voltage that is connected to the direct voltage input of the inverter element exceeds an upper threshold value. In these embodiments, the electronic control system measures the voltage value that is connected to the direct voltage input and switches a switching element which causes a group of solar panels to stop contributing to the voltage at the direct voltage input of the inverter element, so that the voltage is again below the threshold value.

In some embodiments, the threshold value is equal to a maximum permissible voltage within the inverter switching systems that is specified in accordance with the standards. In some embodiments, the maximum threshold value which is not to be exceeded lies at 850 V.

In other embodiments, the switching system includes a switching element which the electronic control system causes to disconnect the at least one inverter input of the inverter from the direct voltage input of the inverter element if the network voltage and/or the network frequency of the network which is connected to the inverter output lies outside a previously specified normal voltage range or normal frequency range. This switching system is activated if irregularities are detected in the network. In these cases, the inverter is not allowed to feed its alternating voltage into the network and must be disconnected from the network. This, however, would mean that the solar panels would be operating under an excessively high open-circuit voltage (higher than the threshold value), so that, at the same time or nearly the same time at which disconnection from the network takes place, a switching element is activated, which in turn disconnects a group of solar panels from the input of the inverter element. Therefore the voltage which is connected to the direct voltage input of the inverter element remains below the previously specified threshold value. It must be pointed out herein that the control system, the upper threshold value, the normal voltage range and the normal frequency range are preferably designed or selected so that the disconnection of the group of solar panels from the input of the inverter element takes place primarily via the switching element of this embodiment if irregularities are detected within the network, and the disconnection by the embodiment mentioned farther above (by monitoring the voltage that is connected to the direct voltage input) takes place only in more "exotic" cases if the voltage at the direct voltage input of the inverter element should exceed the previously specified threshold value even though the network is largely unchanged.

In some embodiments, the switching element is electrically arranged between the one of the at least two inverter inputs and the direct voltage input of the inverter element so that it short-circuits this inverter input in order to disconnect this one inverter input from the direct voltage input of the inverter element.

In some of these embodiments, the short-circuiting process consists of a pulsating short-circuit process with a timing ratio that is adjusted so that the voltage at the direct voltage input of the inverter element is brought back below the upper threshold value. In a pulsating short-circuit process within the set timing ratio, the pulse duration of the short circuit in relation to the pulse pause of the short-circuit disconnection is selected so that the resulting voltage on average will drop below the previously specified threshold value. If the voltage is below the specified threshold value again and if there are no other disturbances in the network which is connected to the inverter output, the short-circuiting process can be gradually stopped, e.g., by using a timing ratio which gradually shifts in the direction of zero). In some embodiments, the timing ratio is adjusted by using a servo loop with the measured voltage as the control variable.

In some embodiments, another (second) switching element is arrayed parallel to the (first) switching element; the electronic control system causes this switching element to also short-circuit this inverter input to disconnect the inverter input from the direct voltage input of the inverter element, wherein the first switching element and the second switching element are of differing types.

In some embodiments, the first switching element is a transistor, while the second switching element is a thyristor.

In some embodiments, the electronic control system includes a microcontroller which monitors the network voltage and/or the network frequency of the network at the inverter output as well as the voltage at the direct voltage input of the inverter element.

In other embodiments, the electronic control system includes a safety shut-off which measures the voltage at the direct voltage input of the inverter element and causes the switching system to disconnect the at least one inverter input of the inverter from the direct voltage input of the inverter element if the voltage which is connected to the direct voltage input of the inverter element exceeds an upper threshold value. This safety shut-off guarantees a particular level of safety in ensuring that the disconnection of the at least one group of solar panels from the direct voltage input will be performed.

In further other embodiments, the electronic control system includes both a microcontroller and a safety shut-off, and causes the switching element to disconnect the inverter input from the direct voltage input of the inverter element if the microcontroller detects that the voltage which is connected to the direct voltage input of the inverter element exceeds an upper threshold value and/or the network voltage and/or the network frequency lies outside a previously specified normal voltage range or normal frequency range, or the voltage which is connected to the direct voltage input of the inverter element exceeds an upper threshold value.

In some embodiments, the electronic control system is laid out so that it activates a further switching element which is electrically arrayed between the alternating voltage output of the inverter element and the inverter output, and triggers the disconnection of the inverter element from the network which is connected to the inverter output. This switching element is activated to disconnect the inverter element from the inverter output if the microcontroller detects that there are irregularities in the network which is connected to the inverter output.

In some embodiments, the upper threshold value is selected so that it is not reached in load operation and that the at least two groups of solar panels contribute to the voltage at the direct voltage input of the inverter element in load operation.

In some embodiments, the switching elements are implemented as relays, transistors (e.g., power MOSFETs or IGBTs) or thyristors. IGBTs and MOSFETs are increasingly advancing into fields which were thus far reserved for larger thyristors, such as inverters. The benefit of power transistors as compared to thyristors is the option of being able to switch transistors on or off at any time. Common thyristors can be switched on (fired) at any time, but cannot be switched off again, or can only be switched off again with additional switching activity. This circumstance is a disadvantage particularly in direct voltage applications.

Some embodiments of the invention refer to a process for controlling an inverter for solar panels. The inverter includes at least two inverter inputs to each of which a group of solar panels can be connected, and an inverter output to which a network can be connected, as well as an inverter element with a direct voltage input and an alternating voltage output which converts the direct voltage which is connected to its direct voltage input into alternating voltage and sends it to the inverter output. The process includes monitoring of the direct voltage which is connected to the direct voltage input of the inverter element and the network voltage and/or the network frequency of the network which is connected to the inverter output, and disconnection of the at least one inverter input of the inverter from the direct voltage input of the inverter element if the voltage which is connected to the direct voltage input of the inverter element exceeds an upper threshold value and/or the network voltage and/or the network frequency of the network which is connected to the inverter output lies outside a previously specified normal voltage or normal frequency range.

In some embodiments, the inverter serves to feed the electrical power which is generated by the solar panels into a three-phase 400 V alternating current network.

In some embodiments, the open-circuit voltage of the at least one group of solar panels which are connected to the at least one inverter output which can be disconnected from the direct voltage input of the inverter element is selected so that the load voltage of both groups is largely equal to the open-circuit voltage of the other group of solar panels which is connected to the inverter input that cannot be disconnected from the direct voltage input of the inverter element by the electronic control system.

In some embodiments, the group of solar panels which is connected to the at least one inverter input which can be disconnected from the direct voltage input of the inverter element by the electronic control system possesses a lower open-circuit voltage than the at least one other group of solar panels which is connected to the inverter input that cannot be disconnected from the direct voltage input of the inverter element by the electronic control system. In some embodiments, the one group of solar panels possesses an open-circuit voltage of 850 V, while the other group of solar panels which is connected to the inverter input that can be disconnected from the direct voltage input of the inverter element possesses an open-circuit voltage of 250 V.

If one now returns to the FIGURE, one sees an inverter 1, which includes an inverter element 3 and an electronic control system consisting of a microcontroller 5 and a safety-shut-off 6. Two strings 2.1 and 2.2 are connected to the inputs 7.1 and 7.2 of the inverter 1; these strings are connected in series with each other and provide a direct voltage $U_{ZK}$ at the input 8 of the inverter element 3. Each string 2.1 and 2.2, in turn, consists of the solar panels 4.1-4.3 and 4.4-4.6 which are connected in series with each other. The maximum open-circuit voltage of string 2.1 equals 850 V in the present example, while string 2.2 possesses an open-circuit voltage of 250 V. If both strings 2.1 and 2.2 were to supply their maximum open-circuit voltage, a voltage of 1100 V would be connected to the input 8 of the inverter element 3, which, however, is not permissible in accordance with current standards. On the other hand, it is necessary to have a sufficiently high direct voltage connected to the input 8 of the inverter element 3 during load operation—that is, when the strings feed their voltage into an alternating current network via an inverter—so that it can, for instance, generate a desired 400 V alternating voltage.

The FIGURE shows three solar panels for each string 2.1 and 2.2, even though there may be any desired number of solar panels 4. In the extreme case, a string may also consist of only a single solar panel. The strings 2.1 and 2.2 are connected to the inputs 7.1 and 7.2 of the inverter 1 via the switches Q1 and Q2. These switches serve to disconnect the solar panels 4.1-4.6 from the inverter 1 and the network which is connected to it, e.g., for maintenance work. The microcontroller 5 monitors both the voltage at the input 8 of the inverter element 3 and the voltage, frequency and impedance of the network which is connected to the inverter element 9 into which the inverter 1 feeds its generated alternating voltage. The microcontroller 5 furthermore controls the operation of the inverter element 3 itself. This takes place by means of so-called MPP (Maximum Power Point) tracking. The Maximum Power Point stands for a point of maximum output. This refers to the point on the current-voltage characteristic curve of a solar panel at which the solar panel or the string of solar panels generates maximum output, depending on incoming light and temperature. Using MPP tracking on the connected inverter 1, this point is found and set in nearly every operating state.

The voltage at the input 8 of the inverter element 2 is monitored in order to ensure that a previously specified threshold value of 850 V is not exceeded. The output 9 of the inverter 1 is monitored for compliance with limit parameters in accordance with VDE 0126-1-1. Among other things, this standard states limit parameters for voltage and frequency. The voltage must lie between 80% and 110% of the nominal voltage, while the frequency must lie between 47.5 Hz and 50.2 Hz. Outside these limits, infeed of the generated alternating voltage into the network is interrupted.

The inverter 1 is started up as follows. First, all switches K1-K4 are opened. If a voltage of approx. more than 500 V is now connected to the inverter input 7.1, the microcontroller 5 is supplied with power and commences its function. The power for the microcontroller 5 is taken from the electricity that is generated by the solar panels 4.1-4.6. The microcontroller 5 monitors the network which is connected to the inverter output 9 for irregularities in accordance with the standard VDE 0126-1-1. If the network is in order, the switch K3 is activated (closed); that is, the inverter 1 now feeds the voltage which is generated by string 2.1 into the network. Shortly after this, the switch K1 is also activated (closed), so that both strings 2.1 and 2.2 feed their generated current into the power network. The construction of the switch K3 is subject to specified standards which must be fulfilled so that it is permissible to feed power into the network.

If the microcontroller 5 detects irregularities in the network, the inverter 1 is no longer allowed to feed into the network. Therefore the switch K3 which disconnects the output of the inverter element 3 from the network is opened. Since the strings 2.1 and 2.2 are now disconnected from the network and consequently operating under open-circuit voltage, the voltage $U_{ZK}$ at the direct voltage input 8 of the inverter element 3 would rise above the specified threshold value of 850 V. In order to prevent this, the switch K1 is also opened at the same time at which the switch K3 is opened, so that the string 2.2 is disconnected from the direct current input of the inverter element 3, so that only string 2.1 contributes to the voltage $U_{ZK}$ at the direct voltage input 8 of the inverter element 3. As soon as string 2.2 is disconnected from the direct voltage input of the inverter element 3, the voltage which is connected there will normally not be able to rise above the threshold value.

If the voltage should nonetheless exceed the specified threshold value of 850 V, another control circuit which functions as follows is provided for this event. The microcontroller 5 monitors the voltage which is connected to the direct voltage input 8 of the inverter element 3 for this purpose. If the voltage rises above the specified threshold value, the microcontroller 5 triggers the activation (closing) of the switch K2. Consequently the input 7.2 of the inverter element 3 to which string 2.2 is connected is short-circuited and string 2.2 no longer contributes to the direct voltage at input 8 of the inverter element 3. Another switch K4—a transistor in this case—is provided adjacent to the switch K2; this switch also triggers a short-circuiting process. This switch K4 is constructed differently than the switch K2 and is always activated if the switch K2 is activated by the microcontroller. By short-circuiting string 2.2 instead of disconnecting it (as with the switch K1), the spark formation of the switching process which otherwise occurs when disconnection takes place under load is prevented.

Parallel to the switches K2 and K4, there is a diode 11 which ensures current flow to string 2.1 when the switch K1 is open. Parallel to the diode 11 and switches K2 and K4, there is an RC element, consisting of a resistor 12 and an electrolytic capacitor 13. The RC element triggers extinguishment of the spark when the switch K1 is opened.

The microcontroller 5 can be logically and/or physically subdivided into two parts. The first control circuit activates the switches K1 and K3, depending on irregularities which occur in the network (that is, if the network voltage and/or the network frequency lie outside previously specified normal ranges). If an irregularity occurs in the network, the switch K3 is opened on the one hand, since it is not permitted to feed into the network in this event; on the other hand, the switch K1 is opened to disconnect string 2.2 from the direct voltage input of the inverter element 3. The second control circuit monitors the voltage at the direct voltage input 8 of the inverter element 3 for an exceedance of a threshold value and triggers disconnection of the string 2.2 if a threshold value is exceeded by short-circuiting the input 7.2 of the inverter.

Aside from the microcontroller 5, there is a safety shut-off 6 which also activates the switches K2 and K4 if the voltage at the direct voltage input 8 of the inverter element 3 exceeds a threshold value. For this purpose, the safety shut-off 6 measures the voltage which is connected to the direct voltage input 8 of the inverter element 3 and activates the switches K2 and/or K4, which triggers a short circuit. In the present example, the safety shut-off is linked to the microcontroller 5 via an OR component so that a short circuit takes place if either the microcontroller 5 or the safety shut-off 6 (or both) detect an exceedance of the threshold value. The safety shut-off 6 therefore guarantees a higher level of safety to ensure short-circuiting of the inverter input 7.2 from the direct voltage input 8 of the inverter element 3, since it is provided in addition to the microcontroller 5 in the present example.

As explained in the general section of the description, the short-circuiting process may also take place in the form of pulsating short-circuits. Herein the short-circuit connection is repeatedly interrupted in a specific timing ratio, so that the voltage gradually drops below the specified threshold value.

Two electrolytic capacitors 14 and 15 which are connected in series are provided at the direct voltage input 8 of the inverter element 3. Due to the high voltage (850 V), two electrolytic capacitors are provided here to even out the input current. They furthermore secure the input of the inverter element 3 against voltage variations at the inverter output 9. Instead of the two electrolytic capacitors 14 and 15, this could also be secured using a standard capacitor with a low capacity (1/20 of the capacity of the electrolytic capacitor).

The output of the inverter element 3 is connected to three inductors 16.1, 16.2 and 16.3. The input 8 of the inverter element 3 is furthermore connected to the three phases of the inverter output 10 via six capacitors 17.1-17.6 as in the switching diagram shown in the FIGURE. The inductors 16 and the capacitors 17 together form an LC element which functions as a lowpass filter. Due to the transistors of the converter element 3 and their switching properties, the output 10 of the inverter element 3 largely provides square-wave voltage. The LC element largely evens out the flanks, so that this results in a sinus-formed output current with a low harmonic content which is fed into the network via the inverter output 9.

Even though specified processes and products which were built in accordance with the knowledge of the invention have been described herein, this does not limit the protective range of this patent. On the contrary, this patent covers all embodiments of the teaching of the invention which fall within the protective range of the attached claims, either literally or in the sense of an equivalent teaching.

The invention claimed is:

1. Inverter (1) for solar panels (4), comprising
at least two inverter inputs (7.1, 7.2) to each of which a group of solar panels can be connected, and an inverter output (8) to which a network can be connected,
an inverter element (3) with a direct voltage input (8) and an alternating voltage output (10) which converts a direct voltage which is connected to its direct voltage input (8) into alternating voltage and sends it to an inverter output (9),
an electronic control system (5, 6) which monitors the direct voltage which is connected to the direct voltage input (8) of the inverter element (3) and at least one of a network voltage and a network frequency of the network which is connected to the inverter output (9),
a switching system (K1, K2) which is electrically arrayed between one of the at least two inverter inputs (7) and the direct voltage input (8) of the inverter element (3),
wherein the at least two inverter inputs (7.1, 7.2) of the inverter (1) are connected in series with the direct voltage input (8) of the inverter element (3),
wherein the electronic control system is designed so that it activates the switching system (K1, K2) to disconnect the at least one inverter input (7.2) of the inverter (1) from the direct voltage input (8) of the inverter element (3) if the voltage which is connected to the direct voltage input (8) of the inverter element (3) exceeds an upper threshold value and/or if the network voltage and/or the network frequency lies outside a previously specified normal voltage or normal frequency range,
wherein the switching system includes a switching element (K2) which is triggered by the electronic control system to disconnect the at least one inverter input (7.2) of the inverter (1) from the direct voltage input (8) of the inverter element (3) if the voltage which is connected to the direct voltage input (8) of the inverter element (3) exceeds an upper threshold value, and
wherein the switching element (K2) is electrically arrayed between one (7.2) of the at least two inverter inputs (7.1, 7.2) and the direct voltage input (8) of the inverter element (3) so that it short-circuits this inverter input (7.2) to disconnect this inverter input (7.2) from the direct voltage input (8) of the inverter element (3).

2. Inverter in accordance with claim 1, wherein the switching system includes a switching element (K1) which is triggered by the electronic control system to disconnect the at least one inverter input (7.2) of the inverter (1) from the direct voltage input (8) of the inverter element (3) if the network voltage and/or the network frequency of the network which is connected to the inverter output (9) lies outside a previously specified normal voltage range or normal frequency range.

3. Inverter in accordance with claim 1, wherein the short-circuit consists of a pulsating short-circuit process with a timing ratio which is set so that the voltage at the direct voltage input (8) of the inverter element (3) is brought back below the upper threshold value.

4. Inverter (1) in accordance with claim 1, wherein a second switching element (K4) is arrayed parallel to the switching element (K2), which is triggered by the electronic control system to short-circuit this inverter input (7.2) as well in order to disconnect the inverter input (7.2) from the direct voltage input (8) of the inverter element (3), wherein the first switching element (K2) and the second switching element (K4) are of differing types.

5. Inverter (1) in accordance with claim 1, wherein the electronic control system includes a microcontroller (5) which monitors the network voltage and/or the network frequency of the network at the inverter (9), as well as the voltage at the direct voltage input (8) of the nverter element (3).

6. Inverter (1) in accordance with claim 1, wherein the electronic control system includes a safety shut-off (6) which measures the voltage at the direct voltage input (8) of the inverter element (3) and triggers the switching element (K2) to disconnect the at least one inverter input (7.2) of the inverter (1) from the direct voltage input (8) of the inverter element (3) if the voltage which is connected to the direct voltage input (8) of the inverter element (3) exceeds the upper threshold value.

7. Inverter (1) in accordance with claim 1, wherein the electronic control system includes a microcontroller (5) and a safety shut-off (6) and triggers the switching element (K2) to disconnect the inverter input (7.2) of the inverter (1) from the direct voltage input (8) of the inverter element (3) if the microcontroller (5) detects that the voltage which is connected to the direct voltage input (8) of the inverter element (3) exceeds an upper threshold value and/or the network frequency of the network which is connected to the inverter output (9) lies outside a previously specified normal voltage range or normal frequency range, or the voltage which is connected to the direct voltage input (8) of the inverter element (3) exceeds an upper threshold value.

8. Inverter (1) in accordance with claim 1, wherein the electronic control system is laid out so that it controls a further switching element (K3) which is electrically arrayed between the alternating voltage output (10) of the inverter element (3) and the inverter output (9) and triggers disconnection of the inverter element (3) from the network which is connected to the inverter output (9).

9. Inverter (1) in accordance with claim 1, wherein the upper threshold value is selected so that it will not be reached during load operation and that during load operation, and at least two groups (2.1, 2.2) of solar panels (4) contribute to the voltage at the direct voltage input (8) of the inverter element (3).

10. Process to control an inverter (1) for solar panels, wherein the inverter (1) possesses at least two inverter inputs (7.1, 7.2) to each of which a group of solar panels can be connected, and an inverter output (9) to which a network can be connected, as well as an inverter element (3) with a direct voltage input (8) and an alternating voltage output (10) which converts the direct voltage which is connected to its direct voltage input (8) into alternating voltage and sends it to the inverter output (9), wherein the process includes the following:

Monitoring the direct voltage which is connected to the direct voltage input (8) of the inverter element (3) and the network voltage and/or the network frequency of the network which is connected to the inverter output (9), and Disconnection of the at least one inverter input (7.2) of the inverter (1) from the direct voltage input (8) of the inverter element (3) if the voltage which is connected to the direct voltage input (8) of the inverter element (3) exceeds an upper threshold value and/or the network frequency of the network which is connected to the inverter output (9) lies outside a previously specified normal voltage range or normal frequency range, wherein an open-circuit voltage of at least one group (2.2) of solar panels which is connected to the at least one inverter input (7.2) and which can be disconnected from the direct voltage input (8) of the inverter element (3) by the electronic control system is selected so that the load voltage of both groups (2.1, 2.2) is largely equal to the open-circuit voltage of the other group (2.1) of solar panels which is connected to the inverter input (7.1), which cannot be disconnected from the direct voltage input (8) of the inverter element (3) by the electronic control system.

\* \* \* \* \*

UNITED STATES PATENT AND TRADEMARK OFFICE
CERTIFICATE OF CORRECTION

PATENT NO. : 8,836,162 B2  
APPLICATION NO. : 13/034607  
DATED : September 16, 2014  
INVENTOR(S) : Gerhard Leutwein Page 1 of 1

It is certified that error appears in the above-identified patent and that said Letters Patent is hereby corrected as shown below:

In the Claims,

Column 10, Claim 5, line 32, please delete "nverter" and insert --inverter--.

Signed and Sealed this
Twenty-eighth Day of April, 2015

Michelle K. Lee
*Director of the United States Patent and Trademark Office*